US008824286B2

United States Patent
Lee et al.

(10) Patent No.: US 8,824,286 B2
(45) Date of Patent: Sep. 2, 2014

(54) NETWORK AWARE GLOBAL LOAD BALANCING SYSTEM AND METHOD

(75) Inventors: Young Lee, Plano, TX (US); Yangsong Xia, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 244 days.

(21) Appl. No.: 13/284,644

(22) Filed: Oct. 28, 2011

(65) Prior Publication Data

US 2012/0106333 A1    May 3, 2012

Related U.S. Application Data (60) Provisional application No. 61/408,245, filed on Oct. 29, 2010.

(51) Int. Cl.
*H04L 12/26*    (2006.01)
(52) U.S. Cl.
USPC .......................................... 370/230; 709/241
(58) Field of Classification Search
USPC .......................................... 370/230; 709/241
See application file for complete search history.

(56) References Cited

U.S. PATENT DOCUMENTS

| | | | |
|---|---|---|---|
| 6,910,074 B1* | 6/2005 | Amin et al. | 709/227 |
| 8,094,575 B1* | 1/2012 | Vadlakonda et al. | 370/252 |
| 2002/0036983 A1* | 3/2002 | Widegren et al. | 370/230.1 |
| 2008/0305792 A1* | 12/2008 | Khetawat et al. | 455/435.1 |
| 2011/0206061 A1* | 8/2011 | Sandstrom | 370/458 |

OTHER PUBLICATIONS

Greenberg, A., et al., "Towards a Next Generation Data Center Architecture: Scalability and Commoditization," Presto 08, Aug. 22, 2008, 6 pages.

* cited by examiner

*Primary Examiner* — Wei Zhao
(74) *Attorney, Agent, or Firm* — Conley Rose, P.C.; Grant Rodolph; Brandt D. Howell (57) ABSTRACT

An apparatus comprising a network aware (NA) global load balancing (GLB) component configured to associate with a local data center (DC), couple to an end user via a network, select a server in the DC or in one or more remote DCs coupled to the network based on application resource information and network resource information, and select a route in the network based on the application resource information and the network resource information.

25 Claims, 8 Drawing Sheets

NETWORK AWARE GLOBAL LOAD BALANCING SYSTEM AND METHOD

CROSS-REFERENCE TO RELATED APPLICATIONS

The present application claims priority to U.S. Provisional Patent Application No. 61/408,245, filed Oct. 29, 2010 by Young Lee et al., and entitled "Network Aware Global Load Balancing System and Method," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network carriers, also referred to sometimes as telecommunications operators or communications service providers, that run existing networks desire to optimize the network utilization for passing traffic, such as Internet Protocol (IP) traffic, over a physical network, e.g., across the Open Systems Interconnection (OSI) network layers one to five. The optimized traffic may include traffic for triple play services (e.g., video, voice, and/or data) and any type of bulk data. In existing networks, end-to-end services are typically set-up by Operational Support Systems (OSS) systems or provider specific network management service applications. Network carriers have suggested two different scenarios for optimizing network utilization and traffic: optimizing existing network services and enabling new/emerging network application services.

SUMMARY

In one embodiment, the disclosure includes an apparatus comprising a network aware (NA) global load balancing (GLB) component configured to associate with a local data center (DC), couple to an end user via a network, select a server in the DC or in one or more remote DCs coupled to the network based on application resource information and network resource information, and select a route in the network based on the application resource information and the network resource information.

In another embodiment, the disclosure includes a network component comprising a receiver configured to receive an application request from an end user, a global load (GL) balancer configured to select a server from a plurality of candidate servers in a plurality of DCs and a path from a plurality of candidate paths in a network coupled to the DCs based on a plurality of server related attributes and a plurality of transport network path attributes, and a transmitter configured to indicate the selected server and path to the network to service the end user.

In yet another embodiment, the disclosure includes a method implemented by an application layer and network layer aware component comprising receiving an application request from an end user, establishing intra-DC communications at a local DC to obtain local server load information, establishing inter-DC communications with one or more remote DCs to obtain remote server load information, establishing cross stratum optimization (CSO) communications with a network coupled to the end user and the local and remote DCs to obtain network path load information, and selecting a network route and a DC server based on the local server load information, the remote server load information, and the network path load information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Many application services (e.g., in data centers) may be offered in the application stratum but make significant use of the underlying networks services. The application stratum may include the applications and services implemented or running over the network layer. The actual transport of such application services may be carried on the underlying transport networks. Application stratum services may be characterized by multiple host locations to which end users may receive corresponding services. Further, the internal structure of the applications may be distributed within a DC and/or between DCs.

Current application stratum operations may not be aware or may have limited awareness about the network layer, such as about network usage (e.g., bandwidth availability), network capabilities, congestion status, packet loss, and/or other network layer aspects. Cloud computing services and DCs may provide application services that are distributed geographically around a network. Thus, many decisions (control and management decisions) for the application services, such as where to instantiate another service instance or to which of a plurality of available DCs a new client is to be assigned, may have a substantial impact on the state of the network. The capabilities and the state of the network may also have an impact on application performance. Currently, load balancing decisions are made with no or limited information concerning the underlying network that is used to deliver services. Hence, load balancing decisions may not effectively utilize application and network resources and achieve service objectives.

In some cases, an application controller (e.g., at the application layer or stratum) may estimate the network load based on ping latency (using a ping scheme) and topology, e.g. by tracing routes in the network (e.g., the Internet) and the assumption that the underlying transport network is a Layer 3 (L3) network. Such scheme may assume that the network implements hop-by-hop L3 routing, such as open shortest path first (OSPF) or Intermediate System to Intermediate System (IS-IS) routing protocols. Some carrier's routing scheme may correspond to a hop-by-hop L3 routing scheme. However, in other cases, the network may implement other routing schemes, such as Internet Protocol (IP) tunneling or multiprotocol label switching (MPLS) tunneling, e.g., to override the L3 routing. For example, in some cases, data transport may be based on MPLS Traffic Engineering (MPLS-TE) or generalized MPLS-TE (GMPLS-TE) protocols that may bypass L3 elements or nodes in the network. In such cases, network status estimation techniques at the application stratum that are based on the L3 routing assumption may not be sufficiently accurate. Hence, the resulting application resource allocation to end users may suffer from reduced optimization and/or fail to meet the application performance objectives.

Another disadvantage of current application stratum operations is that an application controller that does not belong to the network may not have access to the network load information and hence may not obtain services using such information from the network. For example, some networks may not reveal the details of such information (e.g., topology, link bandwidth availability, latency, and/or packet loss) to entities outside the network. In such scenarios, it may be useful to offer the application controller some abstraction or virtualization of the network load information from the network side to allow the application controller to obtain improved network services based on the network load information and preserve the privacy of the network stratum. The network stratum may include components that only operate on the transport, network, link, physical layers of the network, or combinations thereof, whereas the application stratum may contain components that operate primarily on the higher layer protocols.

Disclosed herein is a system and methods for implementing NA-GLB in a DC environment. The NA-GLB system may be configured to support CSO. The CSO may comprise the capability to allow a decision making process, such as using a load balancer in a DC, to consider both application stratum resources and network stratum resources. The NA-GLB system may make decisions related to services based on GLB information and using the application stratum resources, the network stratum resources, or both. The decisions may comprise which application server to assign in a DC, where to assign the application server (in which DC), where to instantiate/migrate virtual machines (VMs) associated with an application request, or combinations thereof. The decisions may be made based application resources in both local and remote DCs, network resources that transport application data, user preference, or combinations thereof.

Figure 1:
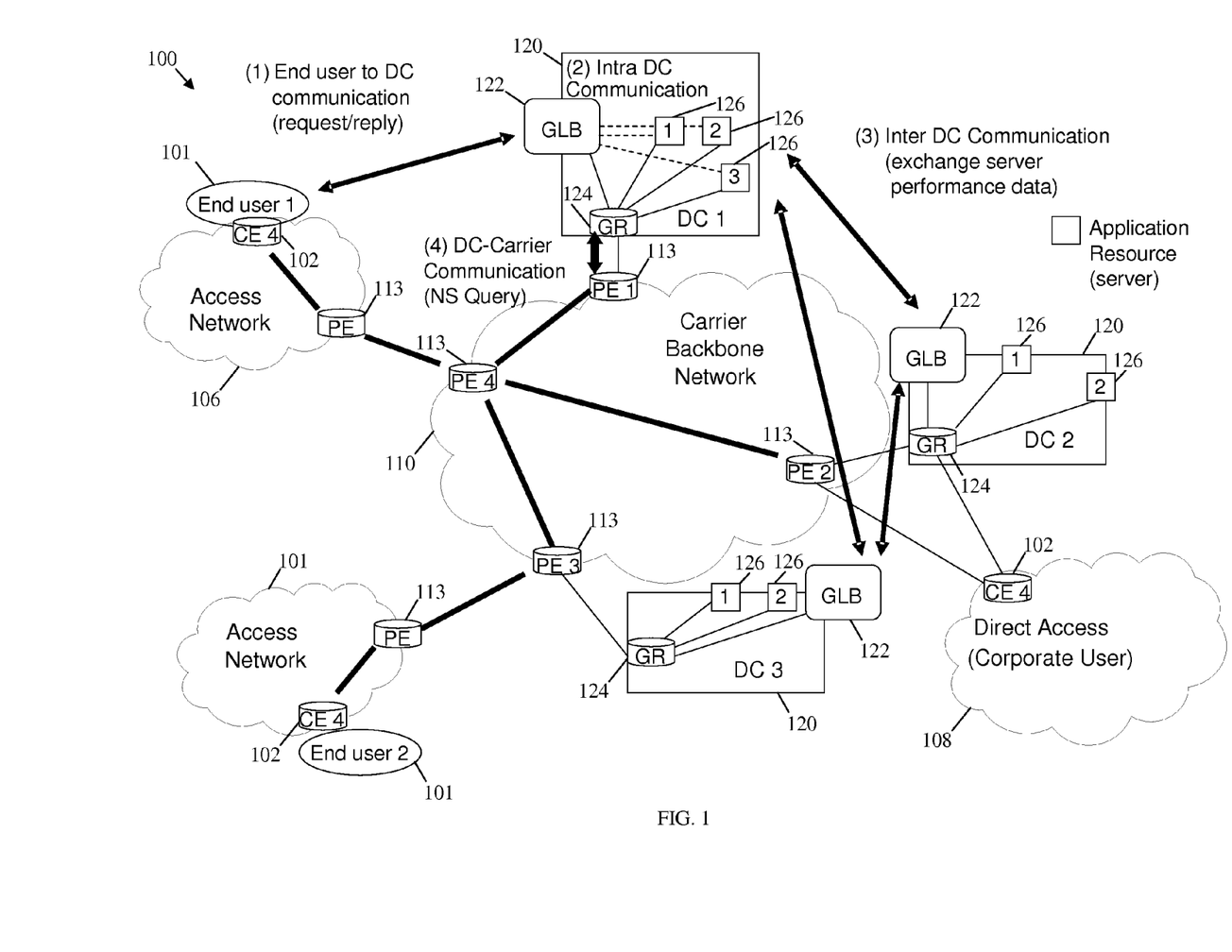
FIG. 1 is a schematic diagram of an embodiment of a NA GLB (NA-GLB) architecture.

FIG. 1 illustrates an embodiment of a NA-GLB architecture 100, which may utilize application and network resources and achieve application or service objectives. The NA-GLB architecture 100 may comprise one or more access networks 106, a carrier backbone network 110 coupled to the access networks 106, and a plurality of DCs 120 coupled to the carrier backbone network 110. The access networks 106 may also be coupled to the DCs 120 directly. The access networks 106, the carrier backbone network 110, and the DCs 120 may comprise any types of networks that may be based on the same or different packet or data transfer technologies, e.g., Ethernet, IP, and/or other technologies. For instance, the networks may comprise electrical links, optical links, wireless links, or combinations thereof. The networks may also comprise a plurality of nodes for routing packets or data networks, such as routers, bridges, and/or switches.

The access networks 106 may comprise a plurality of nodes, including a plurality of customer edge (CE) nodes 102 and a plurality of provider edge (PE) nodes 113. The CE nodes 102 may be coupled to a plurality of end users 101, and the PE nodes 113 may be coupled to the carrier backbone network 110. The end users 110 may be any customer devices, such as fixed and/or mobile user devices (e.g., desktops, laptops, mobile phones, smart phones, computer tablets, set-top boxes). Additionally or alternatively, the end users 110 may comprise customer nodes, such as customer distribution nodes (e.g., customer equipment, optical network units). The carrier backbone network 110 may also comprise a plurality of PE nodes 113 that may be coupled to the access networks 106 and the DCs 120. Each of the DCs 120 may comprise a global load balancer or a GLB component 122, a GLB router (GR) 124 coupled to the GLB component 122 and the carrier backbone network 110, and a plurality of servers 126 coupled to the GLB component 122. The components of the NA-GLB architecture 100 may be arranged as shown in FIG. 1.

The NA-GLB architecture 100 may be implemented as part of a CSO context and architecture and some of the components of the NA-GLB architecture 100 may use a related protocol to communicate and implement a NA-GLB scheme. For instance, an end user 101 may establish end user to DC communications with a GLB component 122, e.g., directly or via the carrier backbone network 110, to request an application service. The requested GLB component 122 may then establish intra-DC communications, with a plurality of local servers 126 to determine candidate local servers 126 that may be capable of providing the services. Additionally, the GLB component 122 may establish inter-DC communications with other GLB components 122 in other DCs 120 to exchange server performance data and determine remote candidate servers 126 that may also be capable of providing the services.

The GLB components 122 in different DCs 120 may exchange application resource information (at the corresponding application strata), and may communicate directly or via the carrier backbone network 110. The GLB components 122 may also communicate with the carrier backbone network 110 to obtain network resource and load balance information (at the network stratum), for instance using a CSO protocol (CSOP). The CSOP is described in U.S. patent application Ser. No. 13/216,805, filed Aug. 24, 2011 by Young Lee et al., and entitled "Method and System for Cross-Stratum Optimization in Application-Transport Networks," which is incorporated herein by reference as if reproduced in its entirety. The obtained server information, application resource information, and network resource and load balance information may then be used (for instance by the requested GLB component 122) to select an appropriate local or remote server 126 in any of the DCs 120 and an efficient or optimized network route through the carrier backbone network 110. The selected server 126 and route may be used to forward the requested application service to the requesting end user 101. The combination of the determined route and selected server 126 may be based on reducing the joint network and server load. The requested GLB component 122 may also send a reply to the end user 101 regarding the success of the request and/or to provide the end user 101 network parameters to communicate with the selected server 126.

The inter-DC communication may be queried from one DC 120 to another upon request or on a periodic basis. The GLB component 122 in the DC 120 may maintain application-server mapping information for both the local DC 120 and the remote DCs 120. The GLB component 122 may be a data center control element configured for interfacing with the end users 101 and may be responsible for assigning the (application) servers 126 to the end users 101. The GLB component 122 may be implemented using hardware, software, or both. The inter-DC communications may allow the GLB component 122 to exchange server performance data among the DCs 120 and implement server selection globally.

Figure 2:
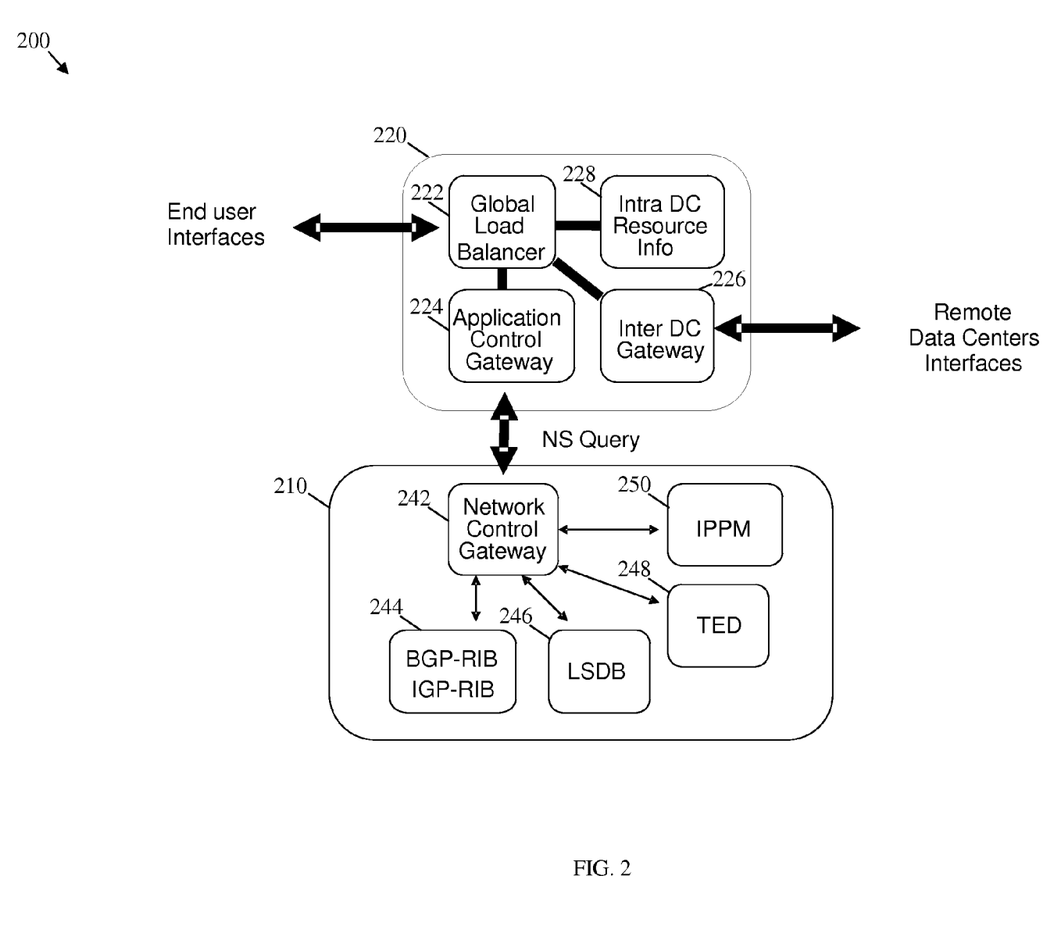
FIG. 2 is a schematic diagram of another embodiment of a NA-GLB architecture.

FIG. 2 illustrates another embodiment of a NA-GLB architecture 200 that describes in more detail interactions between some of the components of the NA-GLB architecture 100. The NA-GLB architecture 200 may comprise a plurality of first components 220 that operate at an application stratum and a plurality of second components 210 that operate at a network stratum. The first components 220 may be located at a DC, e.g., the DC 120, and the second components 210 may be located at a network coupled to the DC, e.g., the carrier backbone network 110. The first components 220 and the second components 210 may communicate using a CSOP. The first components 220 may comprise a global load balancer or GLB component 222, and other components coupled to the GLB component 222, including an application control gateway (ACG) 224, an inter-DC gateway 226, and an intra-DC resource information component 228. The second components 210 may comprise a network control gateway (NCG) 242, and other components that communicate with the NCG 242, including a Border Gateway Protocol (BGP) Router Information Base (RIB)/Interior Gateway Protocol (IGP) RIB 244, a Link State Database (LSDB) 246, a Traffic Engineering (TE) database (TED) 248, and IP Performance Metrics (IPPM) 250.

The GLB component 222 may correspond to the GLB component 122 and may communicate with end user interfaces and assign appropriate server(s) (from local and/or remote DCs) to service end users. To determine or select the server(s), the GLB component 222 may obtain intra-DC resource information from the intra-DC information component 228, inter-DC information via the inter-DC gateway 226, and network resource information via the ACG 224. The intra-DC resource information component 228 may gather local DC resource information including local server loads or server usage information. The inter-DC gateway 226 may gather remote DC resource information including remote server usage information (in remote DCs). The ACG 224 may communicate (using CSOP) with the NCG 242 at the network stratum to obtain network resource information, including relevant network load condition summary, such as bandwidth availability and latency of some point in the network. The ACG 224 may send a network stratum (NS) query to the NCG 242 regarding an application service requested by an end user, and receive in return the network resource information. The NCG 242 may gather network resource information that is relevant to the requested service from the BGP RIB/IGP RIB 244, the LSDB 246, the TED 248, the IPPM 250, and/or other network resource databases (DBs). The end users may comprise any entities that make requests for application services that reach the GLB component 222. When resources are allocated or made available (e.g., servers are selected and network routes are determined), the end users may consume or use the application resources offered by the DC and the network. Thus, the service or application may be provided to the end user while achieving efficient server and network (links and nodes) load balancing.

Figure 3:
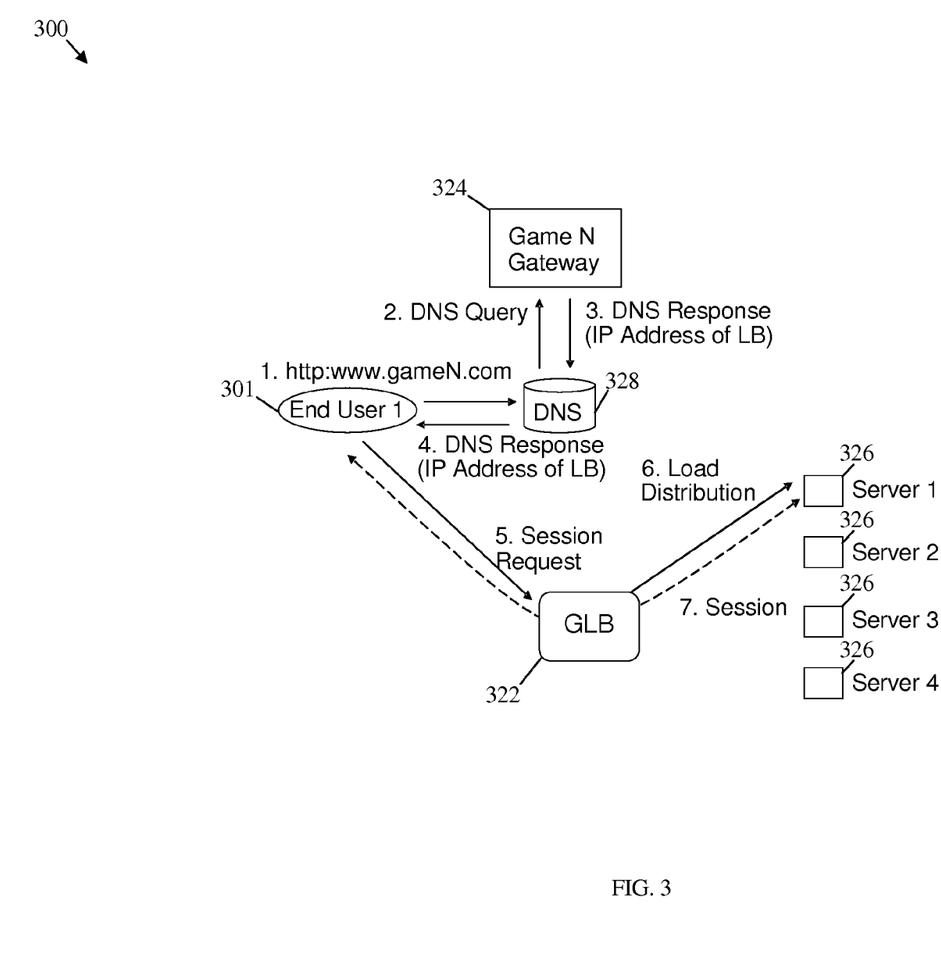
FIG. 3 is a schematic diagram of an access signaling scheme.

FIG. 3 illustrates an embodiment of access signaling scheme 300, which may be used to establish communications between an end user 301 and a DC comprising one or more servers 326, e.g., front-end servers (FEs). The access signaling scheme 300 may also assign a GLB component 322 that selects an appropriate server 326 for the end user 301. The end user 301 may first send an application/service request to a network. For example, the end user 301 may send to the network a request for a "Game N" application in the form of a Universal Resource Locator (URL), http:www.gameN.com. The request may be received by the network, where a Domain Name System (DNS) 328 may be used to send a DNS request to a corresponding application gateway 324 (Game N gateway) to assign a GL balancer. The gateway 324 may return a DNS response that indicates a network address (IP address) of the assigned GL balancer, e.g., the GLB component 322. The DNS response may be forwarded to the end user 301 via the DNS 328. The end user 301 may then send a session request to the GLB component 322, which may select an appropriate server 326, e.g., using inter-DC information, intra-DC information, and network information as described above. After assigning the server 326 to the end user 301, the two components may establish an application service session to exchange corresponding data.

The components participating in the access signaling scheme 300 may be configured similar to the corresponding components in the NA-GLB architectures above. Further, in the access signaling scheme 300, the end user 301 may indicate to the GLB component 322 via the session request user preference information, which may be used by the GLB component 322 with the inter-DC, intra-DC, and network information to select the appropriate server 326. The user preference information may comprise optional user preference information about the server location. For example, in the gaming applications, a game user may specify a preferred server location. The user preference information may also comprise end user terminal information, e.g., codec information for video applications.

Figure 4:
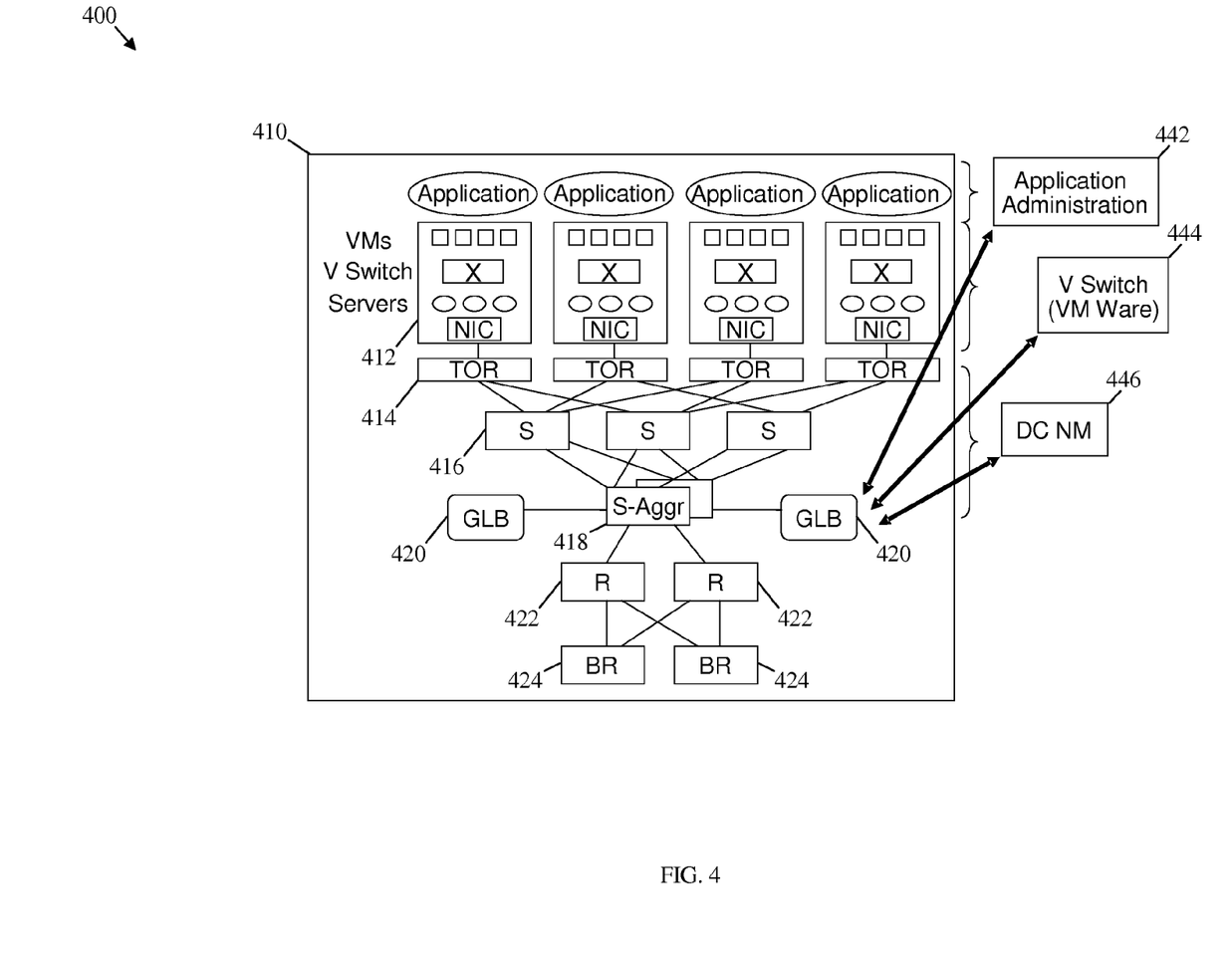
FIG. 4 is a schematic diagram of an inter-DC architecture.

FIG. 4 illustrates an embodiment of an inter-DC architecture 400 that may implement inter-DC communications in a DC. The inter-DC architecture 400 may comprise a plurality of servers 412, a plurality of Top-of-Rack (TOR) switches 414 coupled to the servers 412 via corresponding network interface cards (NICs) in the servers 412, a plurality of Layer 2 (L2) switches 416 (labeled S) coupled to the TOR switches 414, a plurality of L2 switch aggregators 418 coupled to the L2 switches 416, and one or more GLB components 420 coupled to the L2 switch aggregators 418. The L2 switch aggregators 418, L2 switches 416, and TOR switches 414 may be interconnected in a hierarchical architecture as shown in FIG. 4. The inter-DC architecture 400 may also comprise one or more core routers 422 (labeled R) coupled to the L2 switch aggregators 418, and one or more access routers or border routers (BRs) 424 coupled to the core routers 422. The routers and switches in the inter-DC architecture 400 may forward data between the servers 412 and a network (not shown) coupled to the DC.

The servers 412 may be application servers that are configured to interface with end users (not shown) to provide requested applications or services. The GLB component 420 may be configured to implement server (and network) load balancing. The GLB component 420 may comprise an application administration function or block 442, a virtual (V) switch function or block 444, and a DC network management (NM) 446 function or block. The servers 412 may interface (or communicate) with the functions or blocks to enable state-dependent load balancing using the GLB component 420. The functions or blocks may be implemented using hardware, software, or both.

The application administration block 442 may provide a virtual machine (VM) level central processing unit (CPU) and Radio Aware Memory (RAM) requirement to the DC. This may be an off-line VM provisioning process from an application provider to the DC provider. For instance, a "Game N" provider may request the number of VMs that need to be provisioned in the DC for an indicated application. The V switch block 444 may be, for example, a VM aware V switch function, a keyboard, visual display, or mouse (KVM) switch, or a Xen switch. The V switch block 444 may assign the requested VMs to the servers 412. The V switch block 444 may monitor a plurality of server load conditions, which may include CPU, memory/shared memory, a maximum number of simultaneous instances of application usage or some other measure of the application, storage assignable (e.g., at maximum), physical or virtual assignment of processing, memory, storage access rate (disk, RAM, etc.), locality of peer virtual machines, power saving, location of storage and Virtual Local Access Network (VLAN) limit, VM to NIC switching, and/or other server load conditions.

The DC NM block 446 may be responsible for connectivity within a DC across all the switches, e.g., from the TOR switches 414 to the L2 switches 416 and the L2 switch aggregators 418, and from the L2 switch aggregators 418 to the access routers or BRs 424. The DC NM block 446 may be responsible for connectivity or switching from servers 412 NICs to top of rack (ToR) switches 414. The DC NM block 446 may be responsible for connectivity or switching from servers 412 to L2 switches 416, at link and node level. Between servers 412 to L2 switches 416, an Ethernet bridge may not have any available bandwidth data, but the link bandwidth information may be useful along with the server 412 load information. The DC NM block 446 may be responsible for connectivity or switching from L2 switches 416 to L2 switch aggregators 418, at link and node level. Between L2 switches 416 and L2 switch aggregators 418/core routers 422, a plurality of protocols may be supported, including spanning tree protocol (STP) (e.g., fast STP (F-STP) and multiple STP (M-STP)), and shortest path bridging (SPB) that may provide available bandwidth data. The DC NM block 446 may also be responsible for connectivity or switching from L2 switch aggregators 418 to access routers or BRs 424 to the network (e.g., a wireless access network (WAN)), at link and node level.

Figure 5:
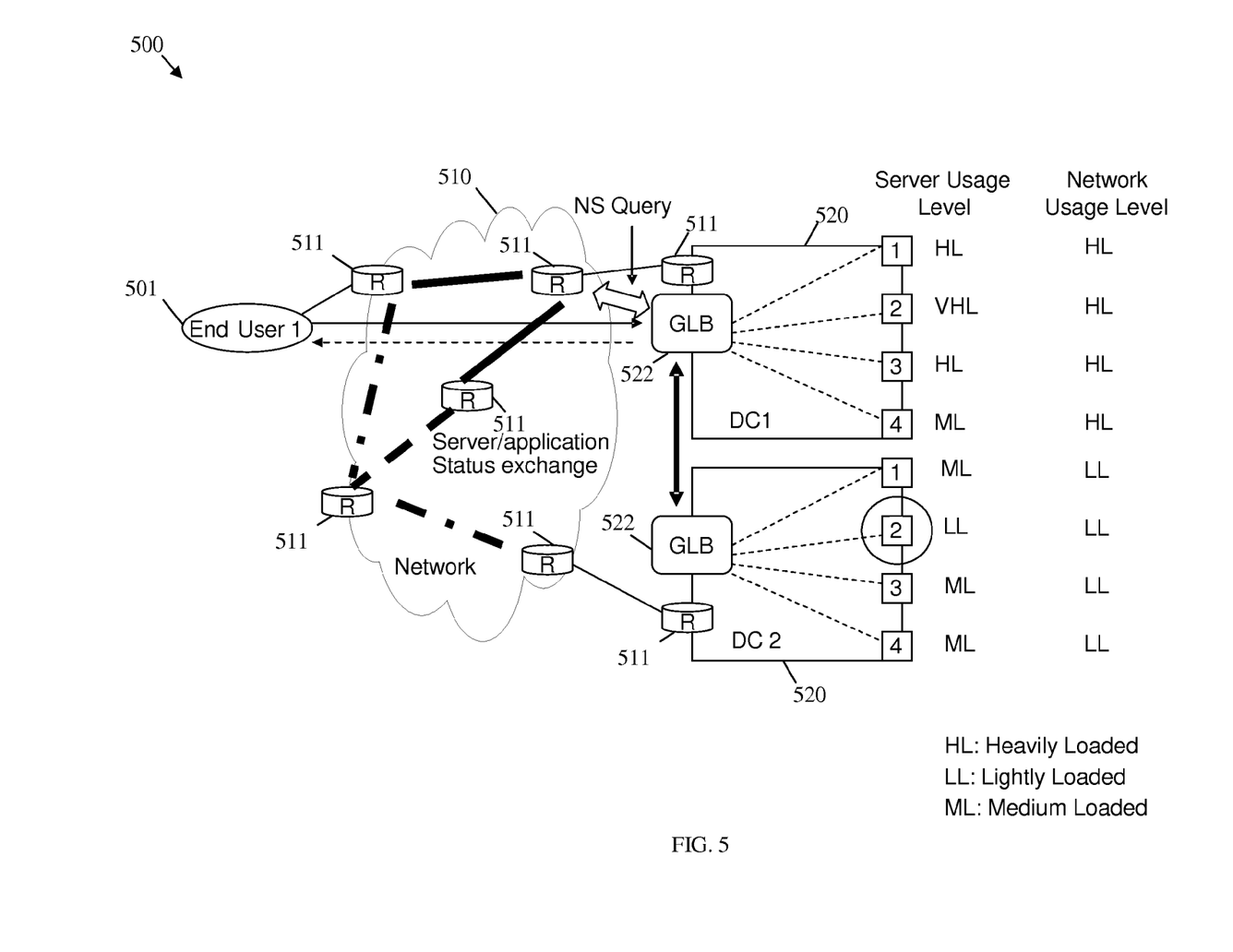
FIG. 5 is a schematic diagram of an embodiment of a NA-GLB scheme.

Current GB balancers may not be aware of servers located in multiple remote DCs. As such, when end users request server resources, the GL balancers may only select a suitable or optimal server among the local servers in the local DC. This GLB scheme may be limited since there may be other servers that may service the user application in remote DCs. FIG. 5 illustrates an embodiment of a NA-GLB scheme 500 that may be implemented according to the architectures described above (the NA-GLB architectures 100 and/or 200). Initially, an end user 501 may access a network 510 and send a NS query to a GL balancer or GLB component 522, e.g., at an application stratum, in a first DC 520 (DC1). The network 510 may comprise a plurality of components and resources, such as a plurality of nodes or routers 511 for forwarding data and services. The NS query may be sent to request accessing a server and/or a path in the network 510 to enable an application or provide a service for the end user 501. The GLB component 522 may maintain or access information about the server usage level and network usage level of different links and/or nodes in the network 510. The server usage level may determine the loads on the different servers in the same DC 520 and the network usage level may determine the network resource usage (e.g., bandwidth usage) of the different paths and routers 511 that connect to the servers. For example, the server and similarly network usage levels may range from heavily loaded (HL), medium loaded (ML), and lightly loaded (LL).

Upon receiving the NS request, the GLB component 522 may compare the different server usage and network usage levels in the same DC 520, such as for four different servers 1, 2, 3, and 4. The GLB component 522 may also communicate with a second GLB component 522 in a second DC 520 (DC2) to compare the server and network usage levels in DC2 with DC1. The GLB component 522 may then determine the paths and routers that may be optimized to provide the application or service to the end user 501. The selected paths and routers 511 may be a compromise between a server selection (SS) algorithm that guarantees a server comprising the requested content and a path computation (PC) algorithm that guarantees improving network utilization (in term of resources or bandwidth). Alternatively, the DC 520 may implement a locally determined policy (by the DC provider) to implement server and network load balancing.

The NA-GLB scheme 500 may support a plurality of communication protocols, including server/application status exchange between different DCs. The application/server status data may be exchanged among the DCs to update the DCs with current server load conditions. The updates may be queried on demand or may be periodic updates. The communication protocols may also include NS query exchange between the end user 501 and the DC 520, which may allow factoring in (by the network 510) the network load condition between the end user 501 and the selected server. The GLB component 522 may obtain the network load condition via a NS query mechanism, e.g., via the ACG 224 in the NA-GLB architecture 200.

The GLB component 522 may select or substantially participate in selecting (with the network 510) the optimal or appropriate server for an application request. The GLB component 522 may implement an ACG function that interfaces with the network stratum at the network 510 (using the NS query) as part of CSOP exchanges with the network 510. Using the CSOP, the GLB component 522 or the DC 520 may provide the location information for the end user's IP address and the IP address of the access router (or BR) that may forward the server/application traffic to the network 510. Depending on the end user application, the location information may be sent to the network 510 in a batched request (for an end user location to multiple server locations) or an individual request (for an end user location to a server location). For location mapping information (e.g., from the server location to the end user location), the query may request network load data, such as bandwidth availability (e.g., minimum bandwidth requirement), latency, jitter, packet loss, and/or other network load data. The query may request such data in different ways or formats. For example, the query may ask "can you tell me if you can route x amount of bandwidth (from server to end-user) within y millisecond (ms) of latency?" The query may also ask "can you tell me if you can route x amount of bandwidth (from server to end-user) with no packet loss?"

At least some of the information needed to respond to the NS query may be available from the network 510. The information may be aggregated into a form suitable for use by the application stratum. For example, the average available bandwidth and many other statistical performance measures may be computed from monitored Simple Network Management Protocol (SNMP) based link statistics and/or currently used routing tables. However, the monitored SNMP based link statistics, the routing table data, and other available network information may not be delivered, e.g., in its entirety or without hiding private network information, to the application stratum (at the DC). Instead, a summary, aggregated, or virtualized information may be sent from the network stratum to the application stratum to avoid revealing more than necessary information concerning the carriers network and/or presenting more than needed information to the application (at the DC/server).

The NCG at the network or network stratum (e.g., NCG 242) may be configured to implement a plurality of operations, including interfacing with the ACG at the DC or application stratum (e.g., 224) for receiving NS queries. The operations may also include upon receiving a NS query, serving the query or request using relevant network level databases, such as IPPM, TED, LSDB, SNMP DB, IGP RIB, BGP RIB, and/or other network DB. The operations may also include upon collecting network data from the databases, summarizing and/or abstracting (virtualizing) the information to a level that is relevant to the application and conforms to the privacy/security of the network.

In an embodiment, the network load conditions (at the network plane), which may be used to determine network routes for candidate servers to meet users application requests, may be summarized, for instance using a bitmap format, into a plurality of categories, such as Lightly Loaded (LL), Medium Loaded (ML), Heavily Loaded (HL), Very Heavily Loaded (VHL), and Busy (B).

The summarized network load conditions may be indicated using a bitmap format, which may reduce the amount of information exchanged between the ACG and the NCG. For instance, different bits associated with different routes to different servers may be set to indicate the load condition or status of the routes (e.g., LL, ML, HL, VHL, or B). Similarly, the application resource load conditions or the server usage level (at the application stratum), which may be used to determine candidate servers to meet user application requests, may be summarized into categories using bitmap format. When this server usage level and the network load condition are combined, the overall service quality of the server may be determined. Some weight may be applied between the server usage and the network usage, e.g., to improve overall service quality estimation.

The server usage level and the network load condition may be determined (e.g., by the GLB component) using a plurality of attributes. The attributes may comprise transport network path attributes and server related attributes. The transport network path attributes may comprise bandwidth availability (BA), latency (L), and the number of hops (NH). The server related attributes may comprise central processing unit (CPU) utilization (CU) and memory availability (MA).

In one embodiment, a two-phase method or algorithm may be used to determine the server usage level and the network load condition. The two-phase algorithm may comprise two steps: a first step may be implemented to filter the transport network path attributes, and a second step to filter the server related attributes. The result of the two-phase algorithm may be a list of candidate routes or paths and one or more candidate servers of which a server and a path may be selected. The algorithm may also use the bitmap format of the summarized load conditions to facilitate, simplify, and/or increase the speed of calculations. The two-phase algorithm may comprise the following operation code:

Step 1: Filter the Transport Network Path
   a) For candidate path (i), check if Required Bandwidth (RB)<=BA (i),
      then i ->{B_feasible set};
      else for j in {B_feasible set}, check if Allowed Maximum Latency (AML)<=L (j)
        then j ->{L_feasible set}
        else next;
   b) K is feasible if k is in {B_feasible set} AND {L_feasible set}
   c) Generate feasible path pool={P1, P2, . . . Pm}
   d) If pool is empty, "there is no feasible path"; else go to Step 2.

Step 2: Filter the Server Related Attributes
   a) For each k from the feasible path pool, check if Memory Requirement (MR)<= MA (k), then k ->{M_feasible set}
      else next;
   b) Choose k such that min {CPU (i)} where i in {M_feasible set}

In another embodiment, the first step of the algorithm above may be implemented before the second step. Thus, the server or a list of candidate servers may be obtained before obtaining a list of candidate paths. Table 1 shows an example for using the network and server related attributes to select a server and path (e.g., using the two-phase algorithm). The server and path may also be selected based on user and/or application requirements that may also be factored in the selection process. The user and/or application requirements may comprise RB=20G, AML=60 ms, and MR of application (if known)=30G. As a result, path 3 may be selected with a server that has about 30% CU and about 100G MA.

TABLE 1

Example of selecting a server and path based on network and server related attributes.

| Candidate Paths | BA | L | NH | CU | MA |
|---|---|---|---|---|---|
| 1 | 100 Gigabit (G) | 55 ms | 4 | 80% | 2000 Terabit |
| 2 | 20 G | 15 ms | 3 | 60% | 400 G |
| 3 | 50 G | 10 ms | 5 | 30% | 100 G |
| 4 | 1 G | 15 ms | 4 | 40% | 30 G |

In other embodiments, an algorithm may be used to determine the server(s) and path(s) jointly, e.g., in one phase, using a combined metric. The combined metric (W) may use weighted combination of the network and server related attributes. The weighted values may be used to rank the attributes in term of importance or priority. Infeasible attributes may be assigned an infinite value weight. For example, the following operation code may be included in such a weighted average method or algorithm:

Select path i such that min (i) over Sum {W(i, j)} for all j in the participating attribute set and all i in the candidate path set.

Figure 6:
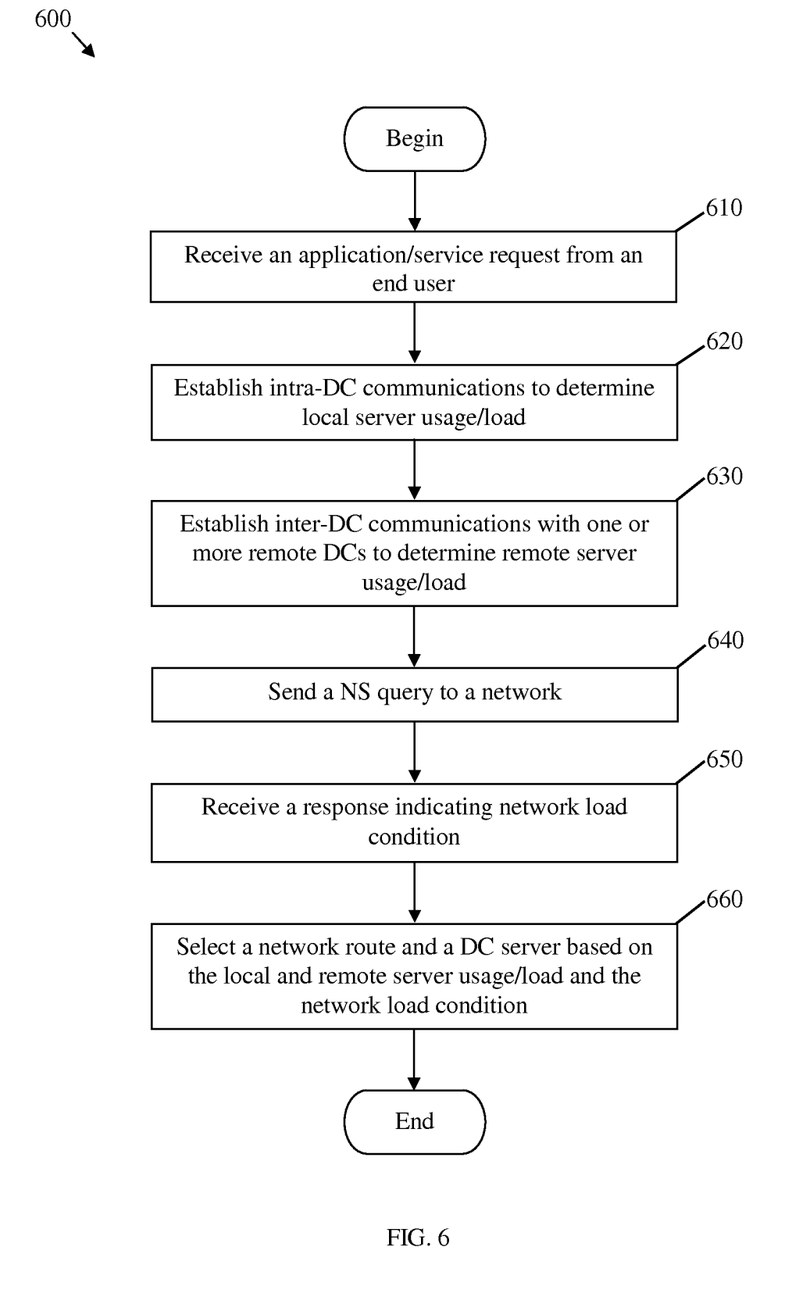
FIG. 6 is a flowchart of an embodiment of a network aware GLB method.

FIG. 6 illustrates an embodiment of a NA-GLB method 600 that may be implemented by a GL balancer or a GLB component, e.g., the GLB component 122 or 222. The method 600 may begin at block 610, where an application/service request may be received from an end user. For example, the end user 501 may send the request to the GLB component 522 at the DC 520 via the network 510 (e.g., a carrier or provider network). At block 620, intra-DC communications may be established to determine local server usage/load. The GLB component of the DC may communicate internally with local servers to obtain server usage and/or load information. At block 630, inter-DC communications may be established with one or more remote DCs to determine remote server usage/load. The GLB component may communicate with remote GLB components at remote DCs (e.g., via the carrier or access network) to request and obtain remote server usage and/or load information.

At block 640, a NS query may be sent to a network. An ACG coupled to the GLB component may send the NS query to a NCG at the carrier or provider network that couples the end user to the DC. At block 650, a response indicating network load condition may be received. The network may send the response comprising a summary or virtualization of network load condition and optionally other network resource information that may be used by the GLB component for server and route determination on the global network level. The information in the response may be abstracted or virtualized by the network to protect network privacy and security from outside entities, such as the DC. Additionally, the GLB component may send a path reservation request to the network and receive in response a network reservation status that indicates a success or failure of the path reservation request (not shown). At block 660, a network route and a DC server may be selected based on the local and remote server usage/load and the network load condition. The GLB component may use the inter-DC information, intra-DC information, and network load/resource information to select the optimal or most efficient server and route for delivering the requested application/service to the end-user. The server and route may be determined using the algorithms described above. The application/service may be delivered from the selected server at one of the remote and local DCs via the selected route in the carrier or provider network that couples the server to the end user. The method 600 may then end.

Figure 7:
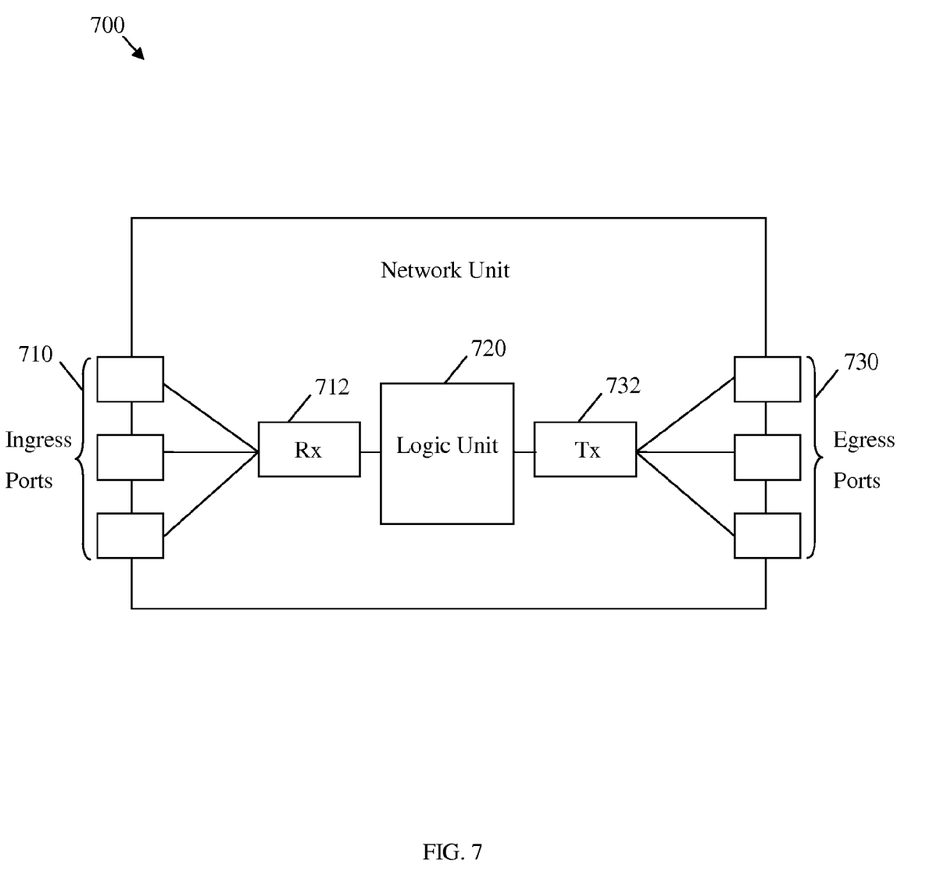
FIG. 7 is a schematic diagram of an embodiment of a network unit.

FIG. 7 illustrates an embodiment of a network unit 700, which may be any device that transports and processes data through the network. For instance, the network unit 700 may be located in a DC and may correspond to a GLB component, an ACG, or both. The network unit 700 may also be located in a carrier or provider network that is coupled to the DC and to an end user and may correspond to a NCG. The network unit 700 may comprise one or more ingress ports or units 710 coupled to a receiver (Rx) 712 for receiving signals and frames/data from other network components. The network unit 700 may comprise a logic unit 720 to determine which network components to send data to. The logic unit 720 may be implemented using hardware, software, or both. The network unit 700 may also comprise one or more egress ports or units 730 coupled to a transmitter (Tx) 732 for transmitting signals and frames/data to the other network components. The receiver 712, logic unit 720, and transmitter 732 may also implement or support the NA-GLB method 600, the NA-GLB schemes above, any of the server and path selection schemes described above, or combinations thereof. The components of the network unit 700 may be arranged as shown in FIG. 7.

Figure 8:
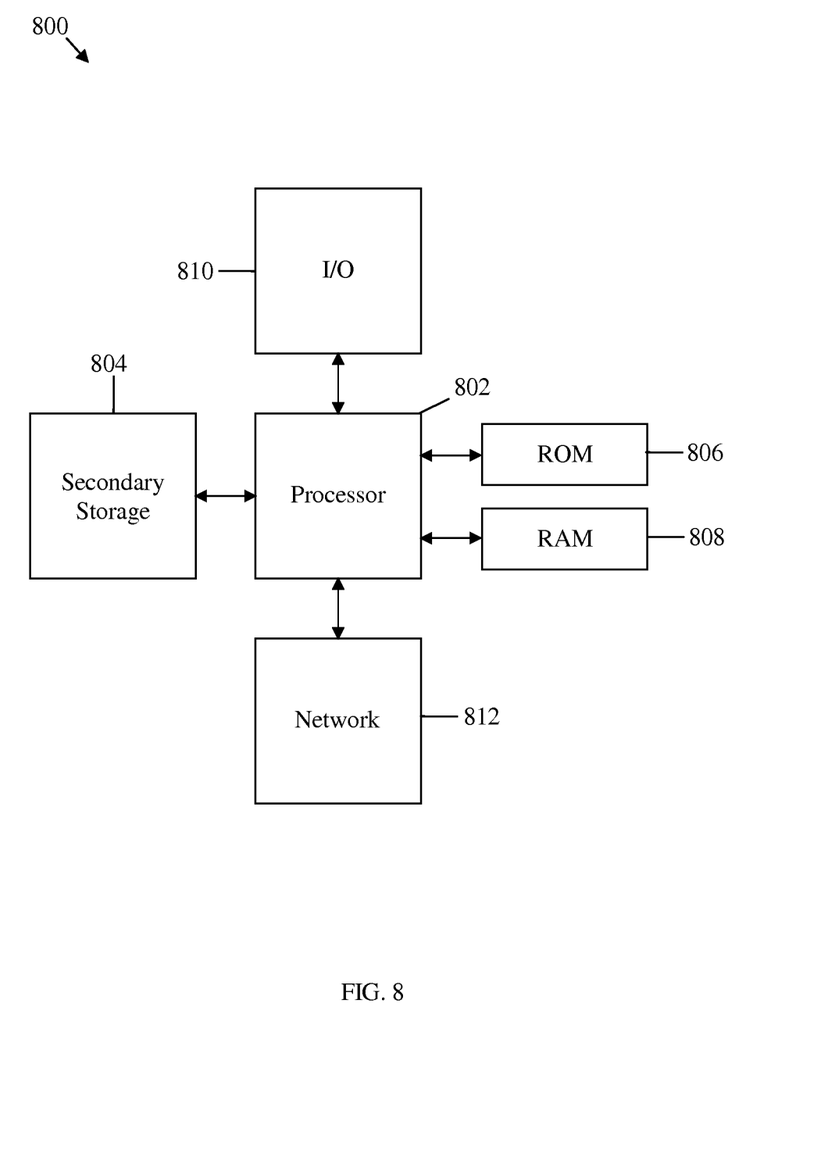
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (e.g., CPU) that is in communication with memory devices including secondary storage 804, read only memory (ROM) 806, RAM 808, input/output (I/O) devices 810, and network connectivity devices 812. The processor 802 may be implemented as one or more CPU chips, or may be part of one or more application specific integrated circuits (ASICs) and/or Digital Display Processors (DSPs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to second storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
 a local network aware (NA) global load balancing (GLB) component configured to:
  associate with a local data center (DC);
  receive a request from an end user via a network;
  communicate with a remote NA GLB component associated with a remote DC to obtain application resource information associated with remote servers positioned in the remote DC;
  communicate with an intra-DC resource information component associated with the local DC to obtain application resource information associated with local servers positioned in the local DC;
  communicate with an application control gateway (ACG) associated with the local DC to obtain network resource information describing routes between the end user, the remote servers, and the local servers;
  select a server to respond to the request, wherein the responding server is selected from a group of servers comprising a plurality of the local servers and a plurality of the remote servers, and wherein the responding server is selected based on the application resource information of the local servers and remote servers and the network resource information; and
  select a route in the network for communicating data between the selected responding server and the end user based on the network resource information.

2. The apparatus of claim 1, wherein the application resource information comprises server load information corresponding to the local servers and the remote servers, and wherein the network resource information comprises network load information.

3. The apparatus of claim 2, wherein the responding server is selected to improve server load distribution among the local servers and the remote servers, and wherein the route is selected to improve network load distribution in the network.

4. A system comprising:
 a network aware (NA) global load balancing (GLB) component configured to:
  associate with a local data center (DC);
  receive a request from an end user via a network;
  select a server to respond to the request, wherein the responding server is selected from a group of servers, wherein the group of servers comprises a plurality of local servers positioned in the local DC and a plurality of remote servers positioned in a remote DC, and wherein the responding server is selected based on application resource information and network resource information associated with the local servers and the remote servers; and
  select a route in the network for communicating data between the selected responding server and the end user based on the application resource information and the network resource information,
 wherein the local DC comprises:
  the GLB component;
  the local servers coupled to the GLB component; a local GLB router (GR) coupled to the GLB component;
  an application control gateway (ACG) coupled to the GLB component and configured to communicate with a network stratum at the network to obtain network resource information including network load condition summary;
  an intra-DC resource information component coupled to the GLB component and configured to gather local DC resource information including local DC server load information; and
  an inter-DC gateway coupled to the GLB component and configured to gather remote DC resource information including remote server load information.

5. The system of claim 4, wherein the network comprises a plurality of provider edge (PE) routers coupled to the end user via a customer edge (CE) router, to the local DC via the local GR, and to a plurality of remote GLB components in a plurality of remote DCs via a plurality of remote GRs.

6. The system of claim 4, wherein the network comprises:
 a network control gateway (NCG) coupled to the ACG; and
 a plurality of network information data bases (DBS) including a Border Gateway Protocol (BGP) Router Information Base (RIB)/Interior Gateway Protocol (IGP) RIB, a Link State DB (LSDB), a Traffic Engineering (TE) DB (TED), and an Internet Protocol (IP) Performance Metrics (IPPM) DB.

7. The system of claim 6, wherein the NCG is configured to communicate with the ACG using a cross stratum optimization (CSO) protocol (CSOP) and to send network resource information to the ACG in response to a Network Stratum (NS) query from the ACG.

8. The system of claim 4, wherein the local DC further comprises:
 a plurality of switches positioned between the local servers and the GLB component;
 a core router coupled to the switches; and
 a border router coupled to the core router,
 wherein the switches comprise a plurality of top-of-rack (TOR) switches coupled to the servers, a plurality of Layer 2 (L2) switches coupled to the TOR switches, and a plurality of switch aggregators coupled to the L2 switches and the GLB.

9. The system of claim 4, wherein the network comprises a Domain Name System (DNS) configured to indicate a network address for the GLB component to the end user in response to an application request from the end user.

10. A network component comprising:
 a receiver configured to:
  receive an application request from an end user;
  receive, from a remote global load (GL) balancer associated with a remote DC, server related attributes associated with candidate remote servers positioned in the remote DC;
  receive, from an intra-DC resource information component, server related attributes associated with candidate local servers positioned in a local DC; and receive, from an application control gateway (ACG) associated with the local DC, network path attributes describing a plurality of candidate paths between the end user, the candidate remote servers, and the candidate local servers;

a local GL balancer coupled to the receiver and configured to:
- select a server to service the application request from the candidate servers; and
- select a path for communicating data between the selected server and the end user from the candidate paths based on the network path attributes; and a transmitter coupled to the local GL balancer and configured to indicate the selected server and the selected path to the network to service the end user.

11. The network component of claim 10, wherein the network path attributes comprise bandwidth availability (BA), latency (L), and a number of hops (NH), and wherein the server related attributes comprise central processing unit (CPU) utilization (CU) and memory availability (MA).

12. The network component of claim 10, wherein the selected server and the selected path are further selected based on user preference information, and wherein the user preference information comprises optional user preference information regarding a preferred selected server location, end user terminal information, or both.

13. The network component of claim 10, wherein the selected server and the selected path are selected using a two-phase algorithm comprising a first step to filter the network path attributes and a second step to filter the server related attributes, and wherein the first step is implemented before the second step.

14. The network component of claim 10, wherein the selected server and the selected path are selected using a two-phase algorithm comprising a first step to filter the network path attributes and a second step to filter the server related attributes, and wherein the first step is implemented after the second step.

15. The network component of claim 10, wherein the selected server and the selected path are selected using a weighted average algorithm that comprises using a weighted combination of network and server related attributes in a combined metric (W), wherein a plurality of weighted values are used to rank the network and server attributes in terms of priority, and wherein infeasible attributes are assigned an infinite value weight.

16. The network component of claim 15, wherein the weighted average algorithm comprises the following operation code:

min (i) over Sum $\{W(i,j)\}$ for all j in a set of attributes and all i in a set of candidate paths.

17. A method implemented by an application layer and network layer aware component comprising:
- receiving an application request from an end user;
- establishing intra-data center (DC) communications with an intra-DC resource component positioned in a local DC to obtain local server load information associated with local servers positioned in the local DC;
- establishing inter-DC communications with one or more remote global load balancing (GLB) components, each positioned in a remote DC, to obtain remote server load information associated with remote servers positioned in the remote DC;
- establishing cross stratum optimization (CSO) communications, via an application control gateway (ACG) associated with the local DC, with a network coupled to the end user and the local and remote DCs to obtain network path load information describing network paths between the end user, the local servers, and the remote servers; and
- selecting a server to respond to the application request from a group of the remote DC servers and the local DC servers and a network route for communicating data between the selected server and the end user based on the local server load information, the remote server load information, and the network path load information.

18. The method implemented by the application layer and network layer aware component of claim 17, further comprising:
- sending a network stratum (NS) query to the network; and
- receiving network resource summary including the network load information;
- sending a path reservation request to the network; and
- receiving a network reservation status that indicates a success or failure of the path reservation request.

19. The method implemented by the application layer and network layer aware component of claim 18, wherein the network resource summary includes the network load information, and wherein the network load information comprises information regarding bandwidth availability, latency, jitter, packet loss, other network load data, or combinations thereof.

20. The method implemented by the application layer and network layer aware component of claim 19, wherein the network resource summary comprises virtualized network load information to provide the local DC sufficient network load information and maintain privacy and security for the network.

21. The method implemented by the application layer and network layer aware component of claim 19, wherein the network resource summary comprises a bitmap format that represents the network load information.

22. The method implemented by the application layer and network layer aware component of claim 21, wherein the bitmap format summarizes network load conditions for a plurality of network routes for candidate servers into a plurality of categories by indicating one of Lightly Loaded (LL), Medium Loaded (ML), Heavily Loaded (HL), Very Heavily Loaded (VHL), and Busy (B).

23. The method implemented by the application layer and network layer aware component of claim 17, wherein the local server load information, the remote server load information, or both are summarized using a bitmap format.

24. The method implemented by the application layer and network layer aware component of claim 17, wherein selecting the network route and the DC server is simplified using a bitmap format for the local server load information, the remote server load information, the network path load information, or combinations thereof.

25. The apparatus of claim 1, wherein the local GLB component communicates with the remote GLB component via an Inter-DC gateway positioned in the local DC.

* * * * *